United States Patent
Min

[19]

[11] Patent Number: 6,104,525
[45] Date of Patent: Aug. 15, 2000

[54] ARRAY OF THIN FILM ACTUATED MIRRORS AND METHOD FOR THE MANUFACTURE THEREOF

[75] Inventor: Dong-Hoon Min, Seoul, Rep. of Korea

[73] Assignee: Daewoo Electronics Co., Ltd., Seoul, Rep. of Korea

[21] Appl. No.: 08/997,517

[22] Filed: Dec. 23, 1997

[30] Foreign Application Priority Data

| Apr. 29, 1997 | [KR] | Rep. of Korea | 97-16170 |
| Apr. 29, 1997 | [KR] | Rep. of Korea | 97-16178 |
| Apr. 29, 1997 | [KR] | Rep. of Korea | 97-16179 |

[51] Int. Cl.[7] .............................. G02B 26/08; G02B 5/08; G02F 1/29
[52] U.S. Cl. ...................... 359/224; 359/223; 359/291; 359/295; 359/318; 359/855
[58] Field of Search .................................... 359/223, 224, 359/291, 295, 318, 855

[56] References Cited

U.S. PATENT DOCUMENTS

| 4,990,997 | 2/1991 | Nishida | 357/71 |
| 5,232,871 | 8/1993 | Ho | 437/190 |
| 5,421,974 | 6/1995 | Witt | 204/192.25 |
| 5,604,140 | 2/1997 | Byun | 437/41 |
| 5,665,209 | 9/1997 | Byun | 204/192.17 |
| 5,668,411 | 9/1997 | Hong et al. | 257/771 |
| 5,757,539 | 5/1998 | Min | 359/290 |
| 5,822,109 | 10/1998 | Jeon | 359/290 |

FOREIGN PATENT DOCUMENTS

| 0741310 | 11/1996 | European Pat. Off. |
| 2313451 | 11/1997 | United Kingdom |
| 2314939 | 1/1998 | United Kingdom |
| 2316757 | 3/1998 | United Kingdom |

*Primary Examiner*—Georgia Epps
*Assistant Examiner*—Evelyn A. Lester
*Attorney, Agent, or Firm*—Anderson Kill & Olick, PC

[57] ABSTRACT

An inventive array of M×N thin film actuated mirrors includes an active matrix, a passivation layer, an etchant stopping layer and an array of M×N actuating structures. The active matrix includes a substrate, an array of M×N transistors, an adhesion layer, a diffusion barrier layer, an array of M×N connecting terminals and a stress balancing layer. The passivation layer is formed on top of the active matrix and the etchant stopping layer is formed on top of the passivation layer. The array of M×N actuating structures includes a first thin film electrode, a thin film electrodisplacive member, a second thin film electrode, an elastic member and a conduit. The diffusion barrier layer located between the substrate and the connecting terminal prevents diffusion of silicon (Si) from the substrate to the connecting terminals.

26 Claims, 18 Drawing Sheets

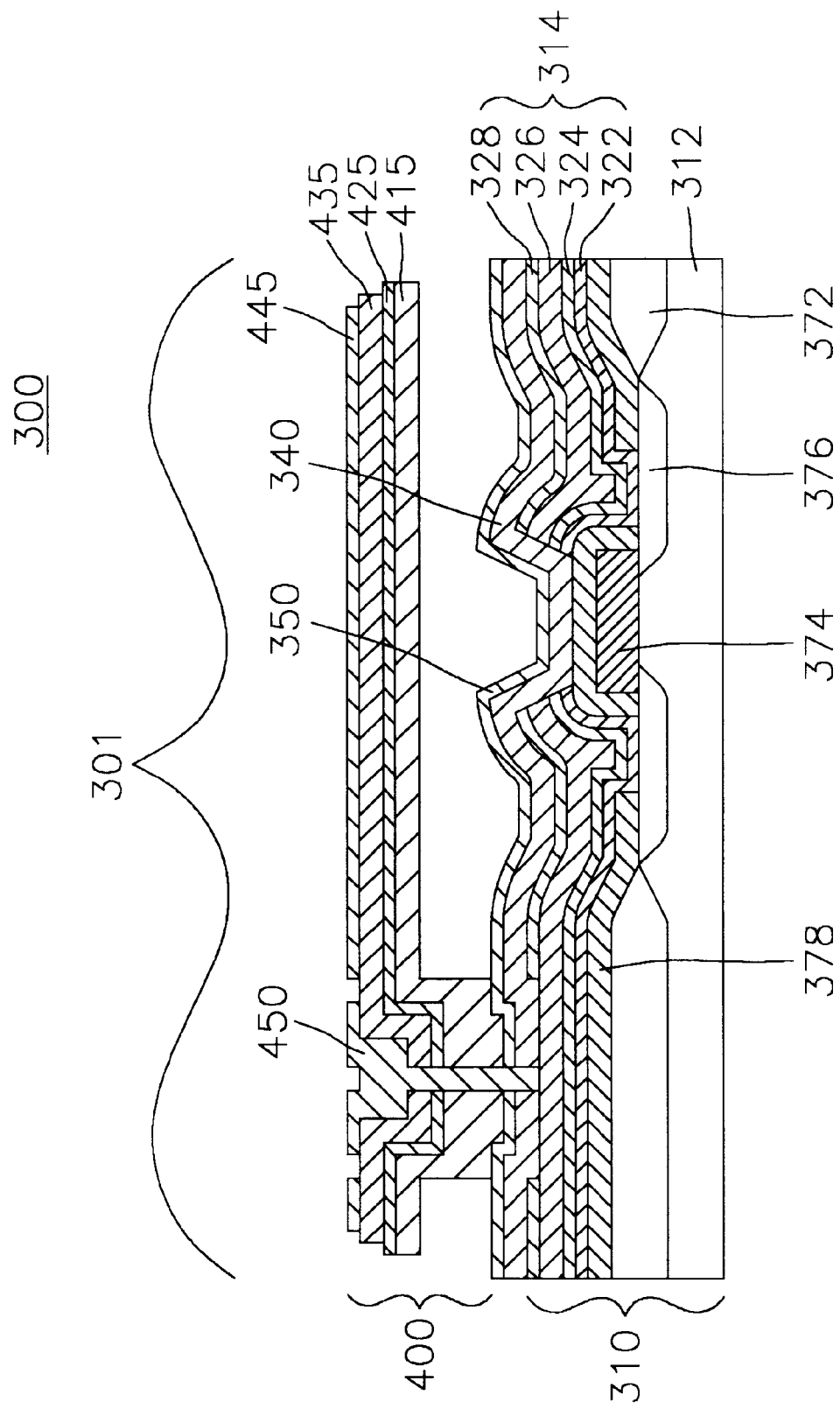

ARRAY OF THIN FILM ACTUATED MIRRORS AND METHOD FOR THE MANUFACTURE THEREOF

FIELD OF THE INVENTION

The present invention relates to an array of M×N thin film actuated mirrors for use in an optical projection system; and, more particularly, to an active matrix having a novel structure to be incorporated in the array.

BACKGROUND OF THE INVENTION

Among the various video display systems available in the art, an optical projection system is known to be capable of providing high quality displays in a large scale. In such an optical projection system, light from a lamp is uniformly illuminated onto an array of, e.g., M×N, actuated mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electric signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIGS. 1A to 1H, there are cross sectional views illustrating a method for manufacturing an array 100 of M×N thin film actuated mirrors 101, wherein M and N are integers, for use in an optical projection system, disclosed in a copending commonly owned application, U.S. Ser. No. 08/602,928, entitled "THIN FILM ACTUATED MIRROR ARRAY FOR USE IN AN OPTICAL PROJECTION SYSTEM".

The process for the manufacture of the array 100 begins with the preparation of an active matrix 110 including a substrate 112 and an array of M×N connecting terminals 114. The substrate 112 is made of an insulating material, e.g., Si-wafer, and the connecting terminal 114 is made of a conducting material, e.g., tungsten (W), as shown in FIG. 1A.

In a subsequent step, there is formed a passivation layer 120, made of, e.g., PSG or silicon nitride, and having a thickness of 0.1–2 μm, on top of the active matrix 110 by using, e.g., a CVD or a spin coating method.

Thereafter, an etchant stopping layer 130, made of silicon nitride, and having a thickness of 0.1–2 μm, is deposited on top of the passivation layer 120 by using, e.g., a sputtering or a CVD method, as shown in FIG. 1B.

Then, a thin film sacrificial layer 140, made of a PSG, and having a flat top surface, is formed on top of the etchant stopping layer 130 by using a CVD or spin coating method, followed by a chemical mechanical polishing (CMP) method.

Subsequently, an array of M×N pairs of empty cavities 145 is created in the thin film sacrificial layer 140 in such a way that one of the empty cavities 145 in each pair encompasses one of the connecting terminals 114 by using a dry or an wet etching method, as shown in FIG. 1C.

In a next step, an elastic layer 150, made of a nitride, e.g., silicon nitride, and having a thickness of 0.1–2 μm, is deposited on top of the thin film sacrificial layer 140 including the empty cavities 145 by using a CVD method.

Thereafter, a second thin film layer (not shown), made of an electrically conducting material, e.g., Pt/Ta, and having a thickness of 0.1–2 μm, is formed on top of the elastic layer 150 by using a sputtering or a vacuum evaporation method. The second thin film layer is then iso-cut into an array of M×N second thin film electrodes 165 by using a dry etching method, wherein each of the second thin film electrodes 165 is electrically disconnected from other second thin film electrodes 165, as shown in FIG. 1D.

Then, a thin film electrodisplacive layer 170, made of a piezoelectric material, e.g., PZT, or an electrostrictive material, e.g., PMN, and having a thickness of 0.1–2 μm, is deposited on top of the array of M×N second thin film electrodes 165 by using an evaporation, a Sol-Gel, a sputtering or a CVD method.

Subsequently, a first thin film layer 180, made of an electrically conducting and light reflecting material, e.g., aluminum (Al) or silver (Ag), and having a thickness of 0.1–2 μm, is formed on top of the thin film electrodisplacive layer 170 by using a sputtering or a vacuum evaporation method, thereby forming a multiple layered structure 200, as shown in FIG. 1E.

In an ensuing step, as shown in FIG. 1F, the multiple layered structure 200 is patterned by using a photolithography or a laser trimming method, until the thin film sacrificial layer 140 is exposed.

In a subsequent step, an array of M×N conduits 190, made of a metal, e.g., tungsten (W), is formed by using a lift-off method thereby forming an array of M×N actuating structures 210, wherein each of actuating structures 210 includes a first thin film electrode 185, a thin film electrodisplacive member 175, a second thin film electrode 165, an elastic member 155 and a conduit 190, the conduits 190 extending from top of the thin film electrodisplacive member 175 to top of a corresponding connecting terminal 114, as shown in FIG. 1G.

Finally, the thin film sacrificial layer 140 is removed by using an wet etching method using an etchant or a chemical, e.g., hydrogen fluoride (HF) vapor, to thereby form an array 100 of M×N thin film actuated mirrors 101, as shown in FIG. 1H.

There are certain deficiencies associated with the above described method for the manufacture of the array 100 of M×N thin film actuated mirrors 101. The connecting terminal 114, made of a conducting material, e.g., tungsten, is formed on top of the substrate 112, made of, e.g., Si-wafer. During the high temperature process in the manufacture of the thin film actuated mirrors 101, the silicon (Si) in the substrate 112 may diffuse to the connecting terminal 114 in such a way that a high resistance material, i.e., tungsten silicide, may form thereon to thereby cause the corresponding thin film actuated mirror 101 to malfunction.

SUMMARY OF THE INVENTION

It is, therefore, a primary object of the present invention to provide an array of M×N thin film actuated mirrors having a novel structure to prevent silicon from diffusing.

It is further object of the present invention to provide a method for the manufacture of such an array of M×N thin film actuated mirrors.

In accordance with one aspect of the present invention, there is provided an array of M×N thin film actuated mirrors, wherein M and N are integers, for use in an optical projection system, the array comprising: an active matrix including a substrate, an array of M×N transistors, an adhesion layer, a diffusion barrier layer, an array of M×N connecting terminals, a stress balancing layer, wherein the diffusion barrier layer is located between the substrate and the connecting terminal, each of the connecting terminals being electrically connected to a corresponding transistor in the array of transistors; a passivation layer formed on top of the active matrix; an etchant stopping layer formed on top of the passivation layer; and an array of M×N actuating structures, each of the actuating structures including a first thin film electrode, a thin film electrodisplacive member, a second thin film electrode, an elastic member and a conduit, wherein the first thin film electrode is located on top of the thin film electrodisplacive member, the first thin film electrode functioning as a bias electrode as well as a mirror, the thin film electrodisplacive member is positioned on top of the second thin film electrode, the second thin film electrode is formed on top of the elastic member, the second thin film electrode functioning as a signal electrode, and the conduit electrically connects the second thin film electrode to a corresponding connecting terminal.

In accordance with another aspect of the present invention, there is provided a method for manufacturing an array of M×N thin film actuated mirrors, wherein M and N are integers, for use in an optical projection system, the method comprising the steps of: preparing a substrate including an array of M×N transistors formed thereon; depositing an adhesion layer; forming a diffusion barrier layer on top of the adhesion layer; forming an array of M×N connecting terminals; depositing a stress balancing layer to thereby form a multi-purpose layer; removing the multi-purpose layer, selectively, thereby forming an active matrix; depositing a passivation layer and an etchant stopping layer, successively, on top of the active matrix; forming a thin film sacrificial layer including an array of M×N pairs of empty cavities; depositing an elastic layer, a second thin film layer, a thin film electrodisplacive layer and a first thin film layer, successively, on top of the thin film sacrificial layer thereby forming a multiple layered structure; patterning the multiple layered structure into an array of M×N semifinished actuating structures until the thin film sacrificial layer is exposed; forming an array of M×N conduits thereby forming an array of M×N actuating structures; removing the thin film sacrificial layer to thereby form an array of M×N thin film actuated mirrors.

BRIEF DESCRIPTION OF THE DRAWINGS

The above and other objects and features of the present invention will become apparent from the following description of the preferred embodiments given in conjunction with the accompanying drawings, wherein:

FIGS. 2A and 2B are cross sectional views setting forth an array of M×N thin film actuated mirrors in accordance with two embodiments of the present invention, respectively;

DETAILED DESCRIPTION OF THE PREFERRED EMBODIMENTS

Figure 1A:
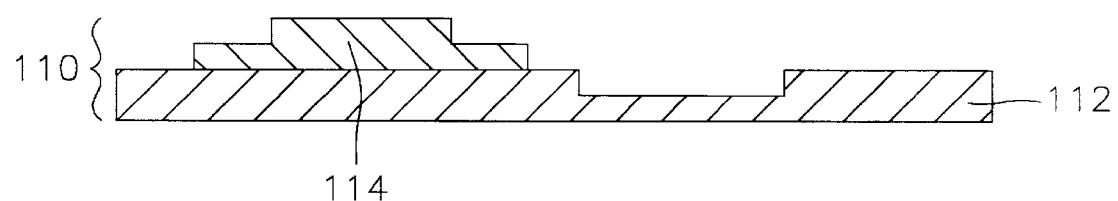
FIGS. 1A to 1H are schematic cross sectional views illustrating a method for the manufacture of an array of M×N thin film actuated mirrors previously disclosed.
Figure 1B:
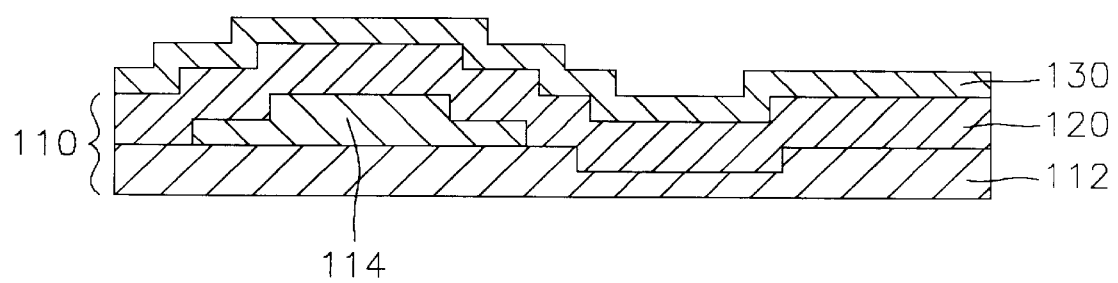
Figure 1C:
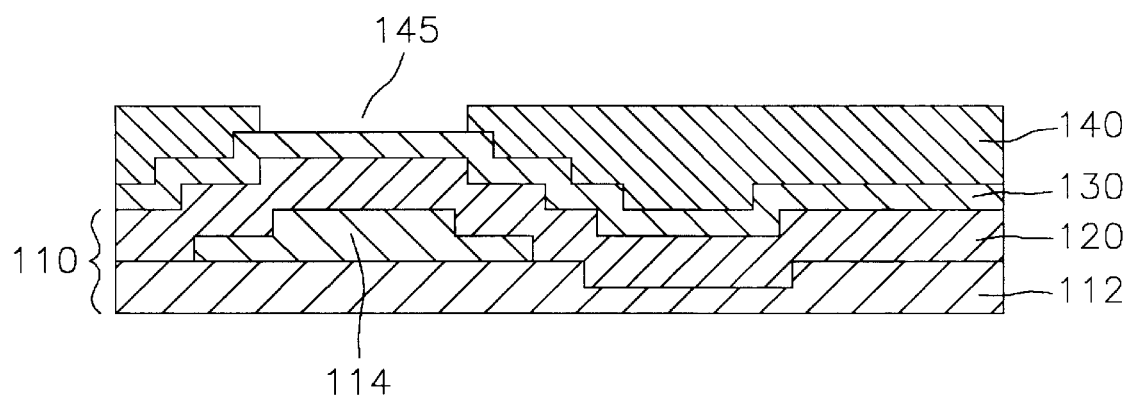
Figure 1D:
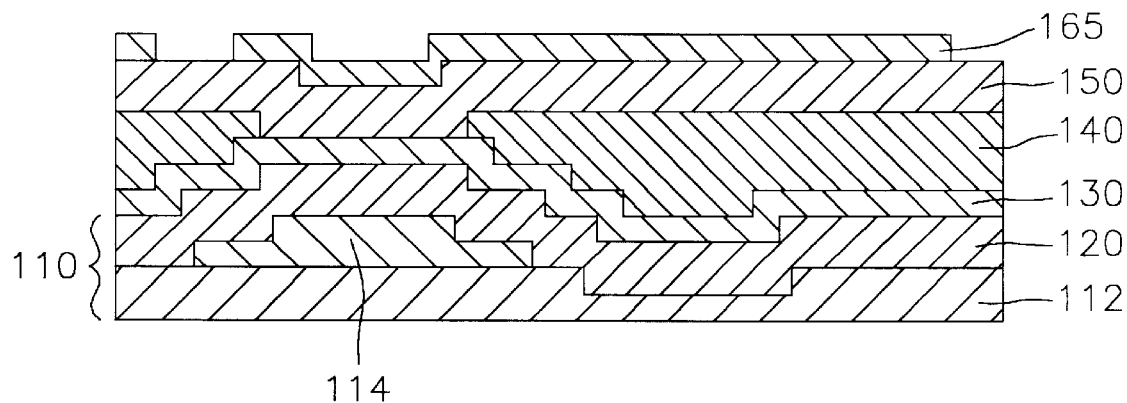
Figure 1E:
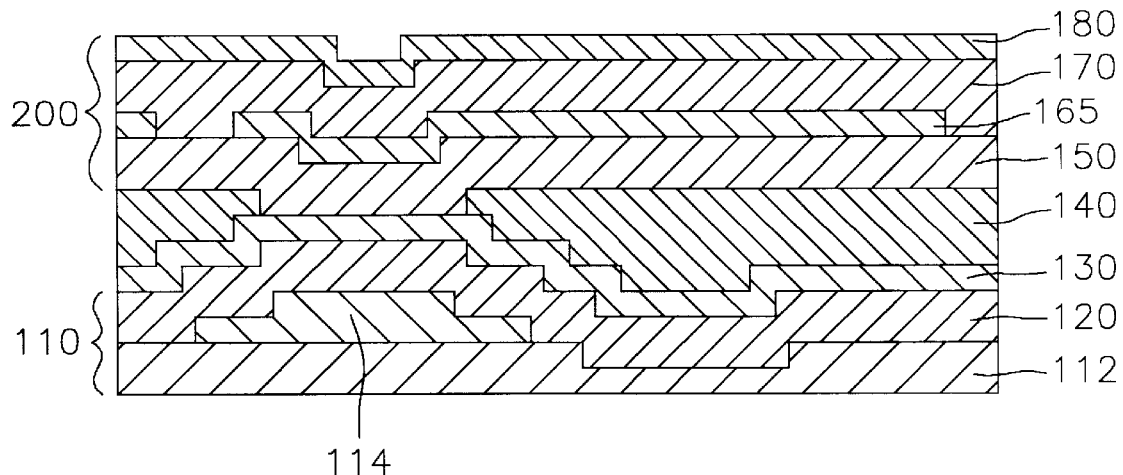
Figure 1F:
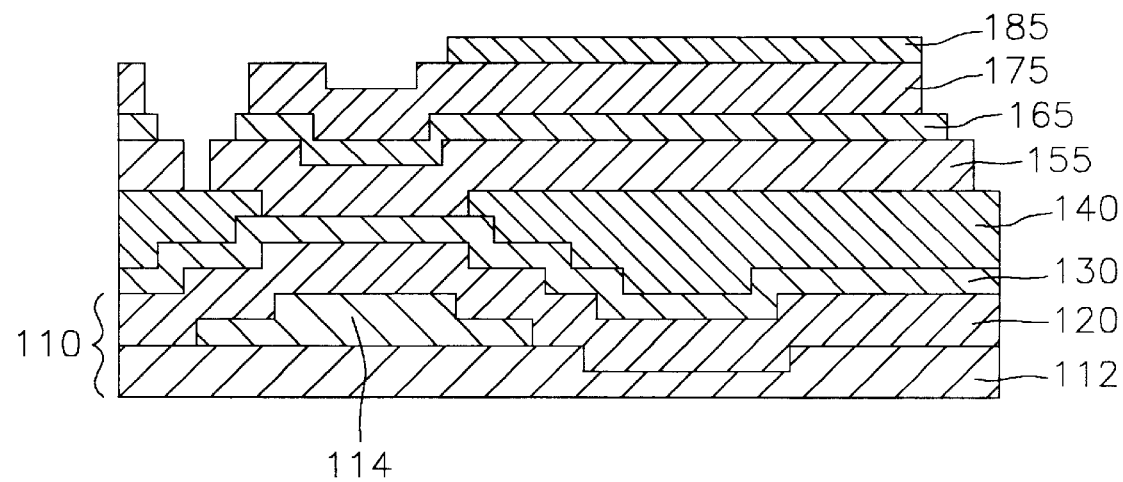
Figure 1G:
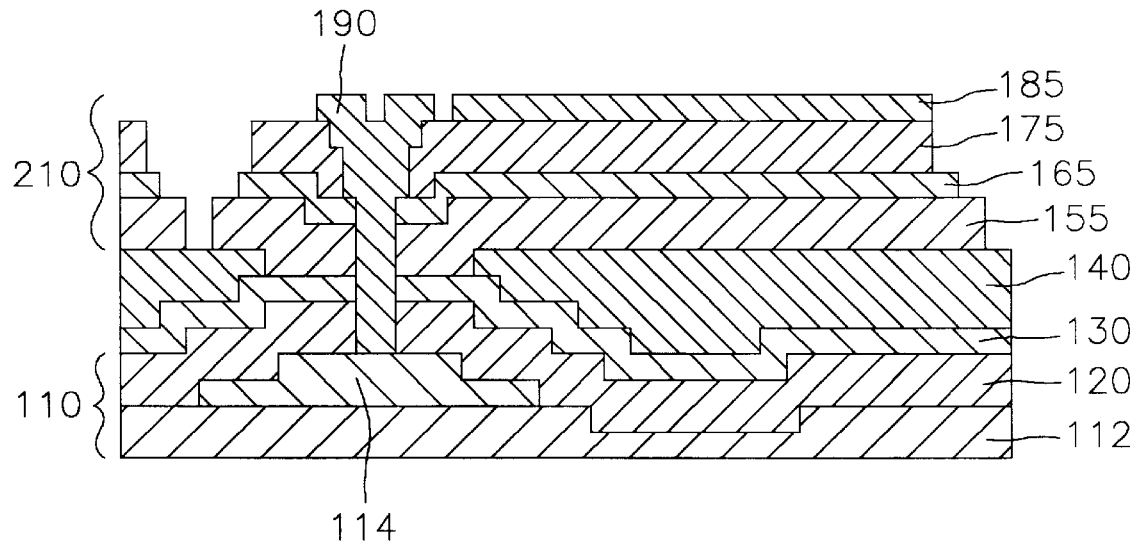
Figure 1H:
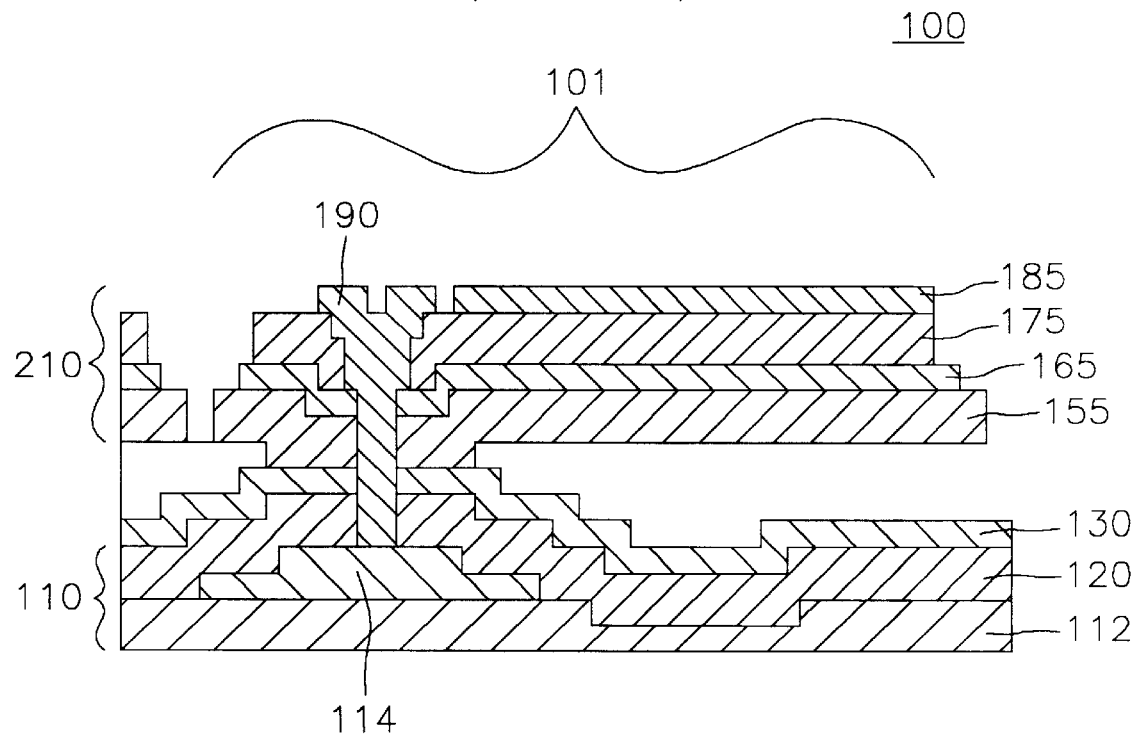
Figure 2B:
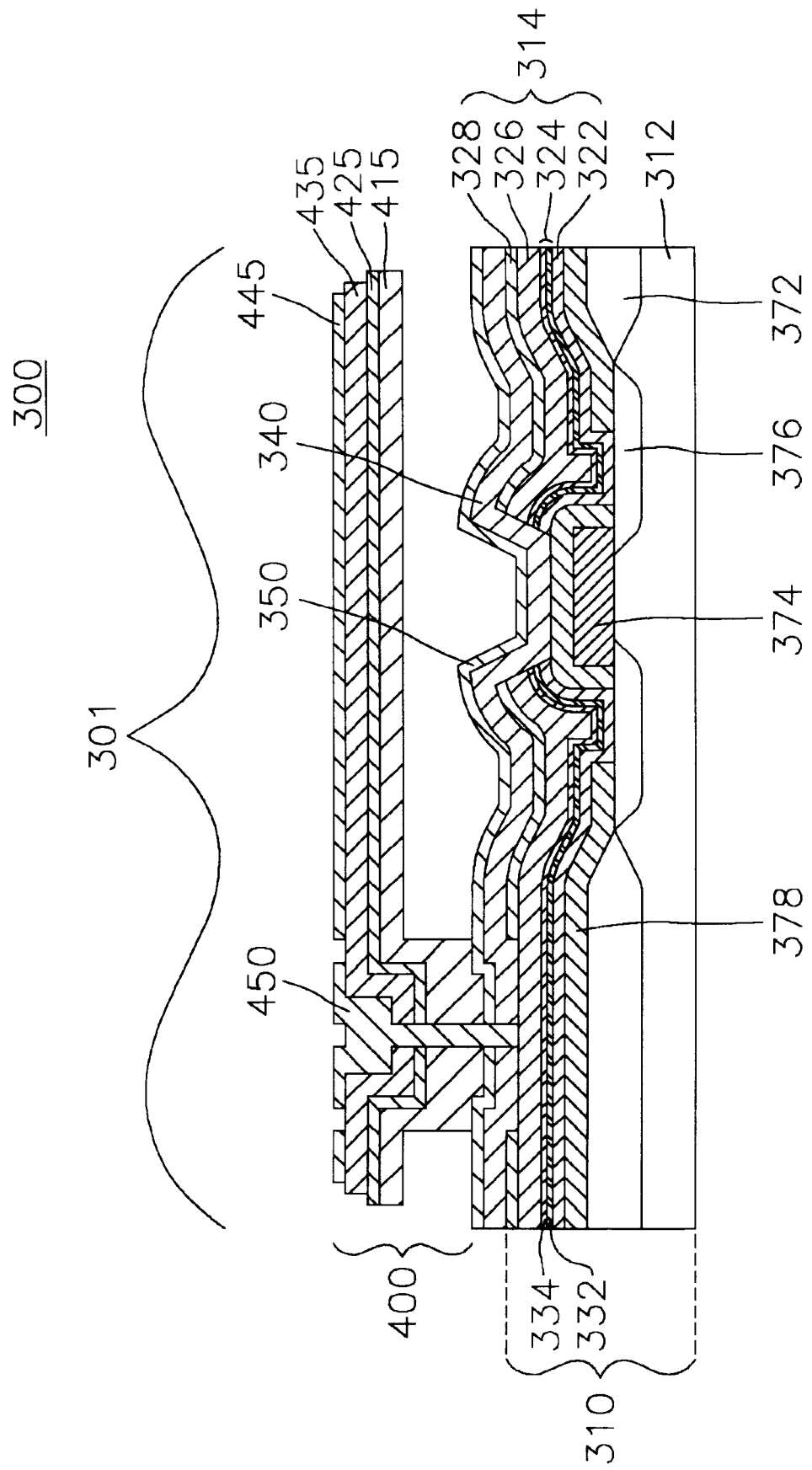

There are provided in FIGS. 2A to 2B, 3A to 3K and 4A to 4K cross sectional views setting forth an array 300 of M×N thin film actuated mirrors 301, wherein M and N are integers, for use in an optical projection system, schematic cross sectional views illustrating a method for the manufacture thereof shown in FIG. 2A, and schematic cross sectional views illustrating a method for the manufacture thereof shown in FIG. 2B, respectively, in accordance with two embodiments of the present invention. It should be noted that like parts appearing in FIGS. 2A to 2B, 3A to 3K and 4A to 4K are represented by like reference numerals.

In FIGS. 2A and 2B, there are provided cross sectional views setting forth an array 300 of M×N thin film actuated mirrors 301 in accordance with two embodiments of the present invention, the array 300 comprising an active matrix 310, a passivation layer 340, an etchant stopping layer 350 and an array of M×N actuating structures 400.

The active matrix 310 is provided with a substrate 312 including an array of M×N transistors 370 (See FIGS. 3A or 4A) and a multi-purpose layer 314. Each of the transistors 370 includes a field oxide layer 372, a gate terminal 374, a source/drain region 376 and a passivation member 378. The multi-purpose layer 314 includes an adhesion layer 322, a diffusion barrier layer 324, an array of M×N connecting terminals 326 and a stress balancing layer 328, wherein the diffusion barrier layer 324 is located between the substrate 312 and the connecting terminals 326, each of the connecting terminals 326, made of a conducting material, e.g., tungsten (W), is electrically connected to a corresponding transistor 370 in the array of transistors 370, and the stress balancing layer 328, made of, e.g., C—TiN, and having a thickness of 500–700 Å, is located on top of the connecting terminals 326.

In accordance with one embodiment of the present invention, the adhesion layer 322, made of, e.g., titanium (Ti) and having a thickness of 100 Å, or made of, e.g., titanium-rich titanium nitride (Ti-rich TiN) and having a thickness of 100–150 Å, is located between the substrate 312 and the diffusion barrier layer 324. The diffusion barrier layer 324, made of TiN and having a thickness of 500–700 Å, is crystallized to a cubic structure, the close-packing plane, i.e., Miller indices (1 1 1), of the cubic structure being parallel with the horizontal direction of the substrate 312, as shown in FIG. 2A.

In accordance with another embodiment of the present invention, the diffusion barrier layer 324 is provided with a lower diffusion barrier layer 332 and an upper diffusion barrier layer 334. The lower and upper diffusion barrier layers 332, 334 are made of, e.g., TiN, and are crystallized to a cubic structure, wherein the lower diffusion barrier layer 332 and the upper diffusion barrier layer 334 consist of TiN having a specific grain size, e.g., 150–200 Å and 80–100 Å, respectively, the grain size of the lower diffusion barrier layer 332 being larger than that of the upper diffusion barrier layer 334, as shown in FIG. 2B. The grain size of the lower and the upper diffusion barrier layer 332, 334 can be controlled by heat treatment, deposition pressure and substrate temperature during the deposition thereof.

The passivation layer 340, made of, e.g., a phosphorsilicate glass (PSG) and having a thickness of 2000 Å, is located on top of the active matrix 310.

The etchant stopping layer 350, made of silicon nitride, and having a thickness of 1000–2000 Å, is positioned on top of the passivation layer 340.

Each of the actuating structures 400 is provided with a proximal and a distal ends, and includes a first thin film electrode 445, a thin film electrodisplacive member 435 made of a piezoelectric or an electrostrictive material, a second thin film electrode 425, an elastic member 415 made of an insulating material and a conduit 450. The first thin film electrode 445, made of a light reflecting and electrically conducting material, e.g., Al, Ag or Pt, is located on top of the thin film electrodisplacive member 435 and is electrically connected to ground, thereby functioning as a bias electrode as well as a mirror. The thin film electrodisplacive member 435 is positioned on top of the second thin film electrode 425. The second thin film electrode 425, made of an electrically conducting material, e.g., Ta or Pt/Ta, is located on top of the elastic member 415 and is electrically connected to a corresponding transistor 370 in the array of transistors 370 through the conduit 350 and the connecting terminal 326, thereby functioning as a signal electrode. The elastic member 415 is located at bottom of the second thin film electrode 425, and a bottom portion at the proximal end thereof is attached on top of the active matrix 310 with the etchant stopping layer 350 and the passivation layer 340 partially intervening therebetween, thereby cantilevering the actuating structure 400. The conduit 450 extends from top of the thin film electrodisplacive member 435 to top of a corresponding connecting terminal 326 and is disconnected to the first thin film electrode 445, thereby electrically connecting the second thin film electrode 425 to the corresponding connecting terminal 326.

In FIGS. 3A to 3K, there are provided schematic cross sectional views illustrating a method for the manufacture of the array 300 of M×N thin film actuated mirrors 301 in accordance with the one embodiment the present invention shown in FIG. 2A.

Figure 3A:
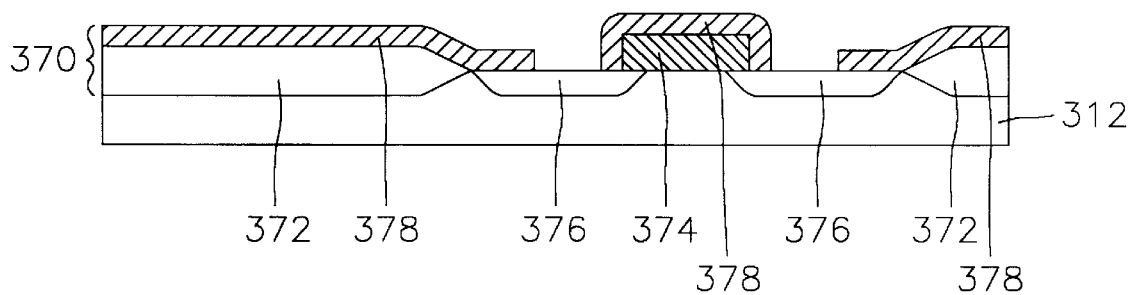
FIGS. 3A to 3K are schematic cross sectional views illustrating a method for manufacturing the array of M×N thin film actuated mirrors shown in FIG. 2A.

The process for the manufacture of the array 300 begins with the preparation of a substrate 312 including an array of M×N transistors 370. The substrate 312 is made of an insulating material, e.g., Si-wafer, and each of the transistors 370 is made of a switching device, e.g., a metal-oxide-semiconductor (MOS) transistor, as shown in FIG. 3A.

Figure 3B:
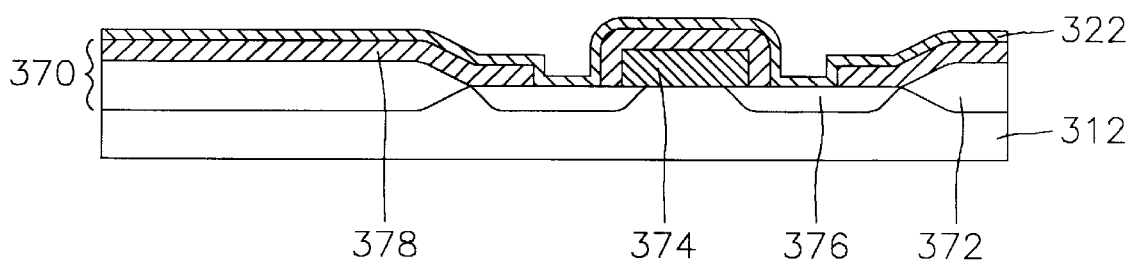

Subsequently, an adhesion layer 322, made of, e.g., titanium (Ti), and having a thickness of 100 Å, or made of, e.g., titanium-rich titanium nitride (Ti-rich TiN), and having a thickness of 100–500 Å, is deposited on top of the substrate 312 by using a sputtering or a CVD method, as shown in FIG. 3B.

Figure 3C:
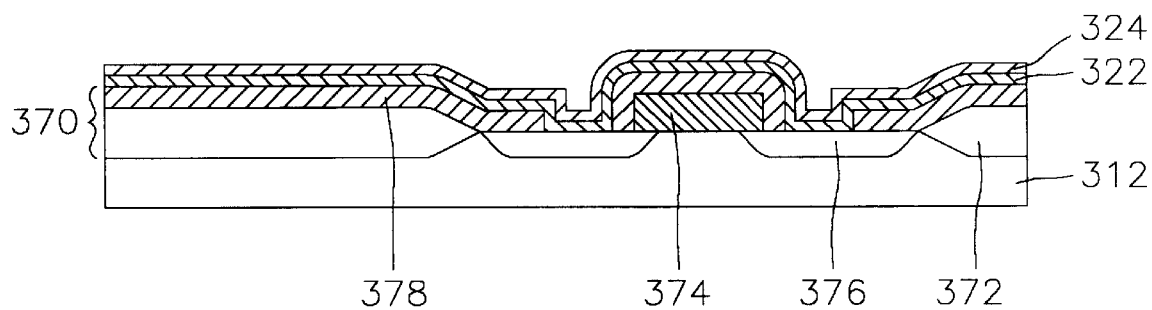

In a next step, a diffusion barrier layer 324, made of, e.g., a TiN, and having a thickness of 500–700 Å, is deposited on top of the adhesion layer 322 by using a PVD method. The diffusion barrier layer 324 is heat treated to release the stress, densify and to allow a phase transition to take place, wherein the close packing plane, i.e., Miller indices (1 1 1) of the cubic structure is parallel to the horizontal direction of the substrate 312, as shown in FIG. 3C. The heat treatment consists of annealing the diffusion barrier layer 324 at 450° C. for 30 minute.

Figure 3D:
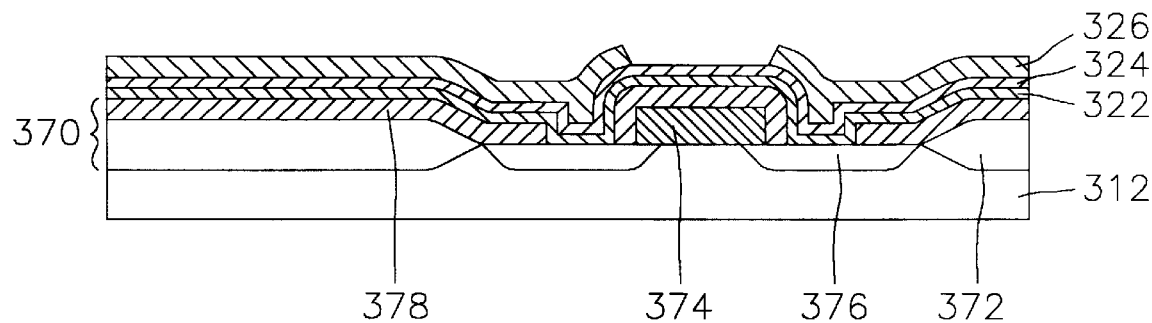

In a following step, an array of M×N connecting terminals 326 is formed on top of the diffusion barrier layer 324. Each of the connecting terminals 326 is electrically connected to a corresponding transistor 370 in the array of transistors 370, as shown in FIG. 3D.

Figure 3E:
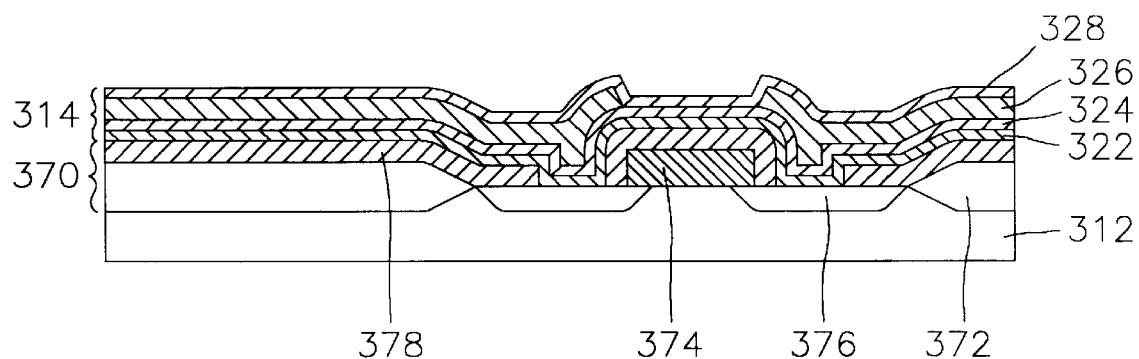

Thereafter, a stress balancing layer 328, made of, e.g., C—TiN, and having a thickness of 500–700 Å, is deposited on top of the connecting terminals 326 by using a physical vapor deposition (PVD) to thereby form a multi-purpose layer 314, as shown in FIG. 3E.

Figure 3F:
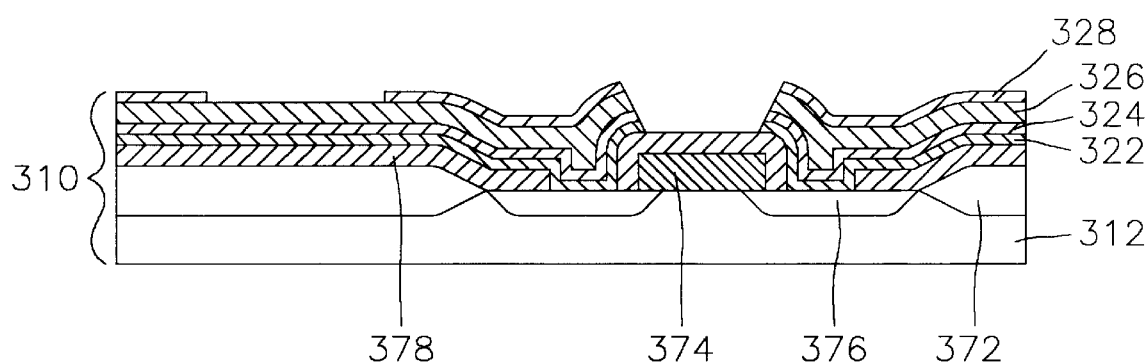

Then, the multi-purpose layer 314 is selectively removed to expose the portion formed above the gate terminal 374 in the transistor 370 to thereby form an active matrix 310, as shown in FIG. 3F.

Thereafter, a passivation layer 340, made of, e.g., PSG, and having a thickness of 2000 Å, is deposited on top of the active matrix 310 by using, e.g., a CVD method.

In a following step, an etchant stopping layer 350, made of silicon nitride, and having a thickness of 1000–2000 Å, is deposited on top of the passivation layer 340 by using a plasma enhanced chemical vapor deposition (PECVD) method.

Then, a thin film sacrificial layer 360, made of, e.g., PSG, and having a thickness of 1.6 $\mu$m, is formed on top of the etchant stopping layer 350 by using an atmosphere press chemical vapor deposition (APCVD) method and followed by a CMP method.

Figure 3G:
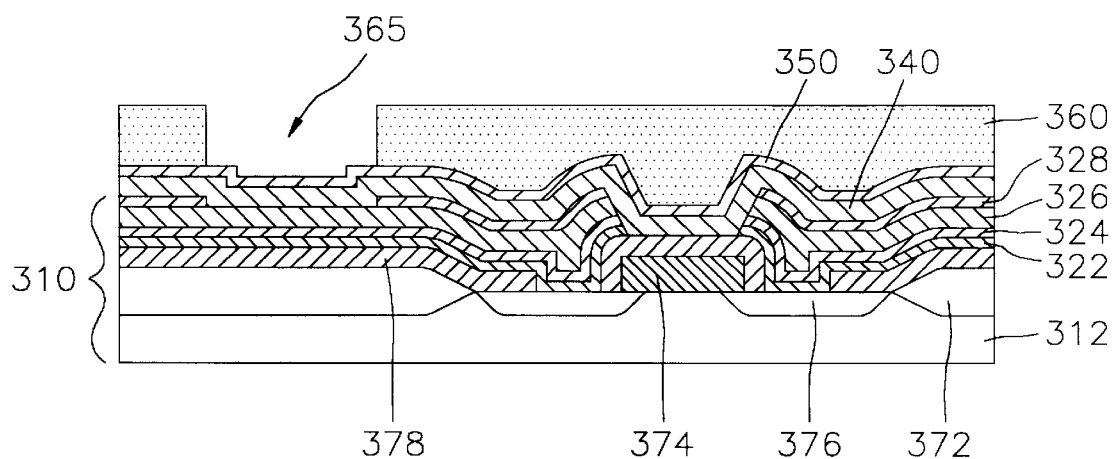

In an ensuing step, an array of M×N pairs of empty cavities 365 is created in the thin film sacrificial layer 360 in such a way that one of the empty cavities 365 in each pair encompasses one of the connecting terminals 326 by using a dry or an wet etching method, as shown in FIG. 3G.

In a next step, an elastic layer 410, made of a nitride, e.g., silicon nitride, and having a thickness of 1000–3000 Å, is deposited on top of the thin film sacrificial layer 360 including the empty cavities 365 by using a LPCVD method.

Thereafter, a second thin film layer 420, made of an electrically conducting material, e.g., Pt/Ta, and having a thickness of 2000–4000 Å, is formed on top of the elastic layer 410 by using a sputtering or CVD method.

Then, a thin film electrodisplacive layer 430, made of a piezoelectric material, e.g., PZT, or an electrostrictive material, e.g., PMN, and having a thickness of 4000–6000 Å, is deposited on top of the second thin film layer 420 by using an evaporation, a Sol-Gel, a sputtering or a CVD method.

Figure 3H:
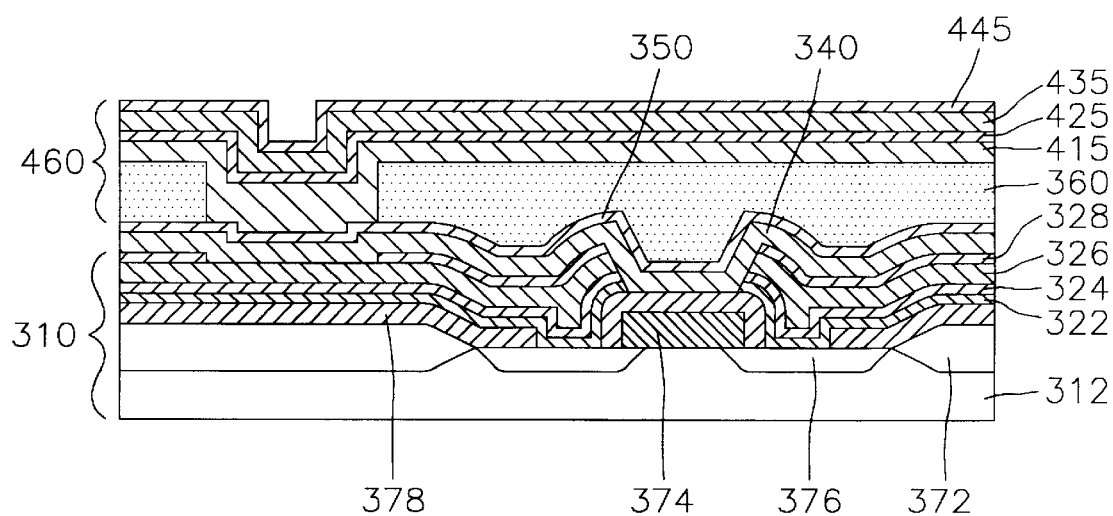

Subsequently, a first thin film layer 440, made of an electrically conducting and light reflecting material, e.g., aluminum (Al), silver (Ag) or platinum (Pt), and having a thickness of 2000–6000 Å, is formed on top of the thin film electrodisplacive layer 430 by using a sputtering or a vacuum evaporation method, thereby forming a multiple layered structure 460, as shown in FIG. 3H.

Figure 3I:
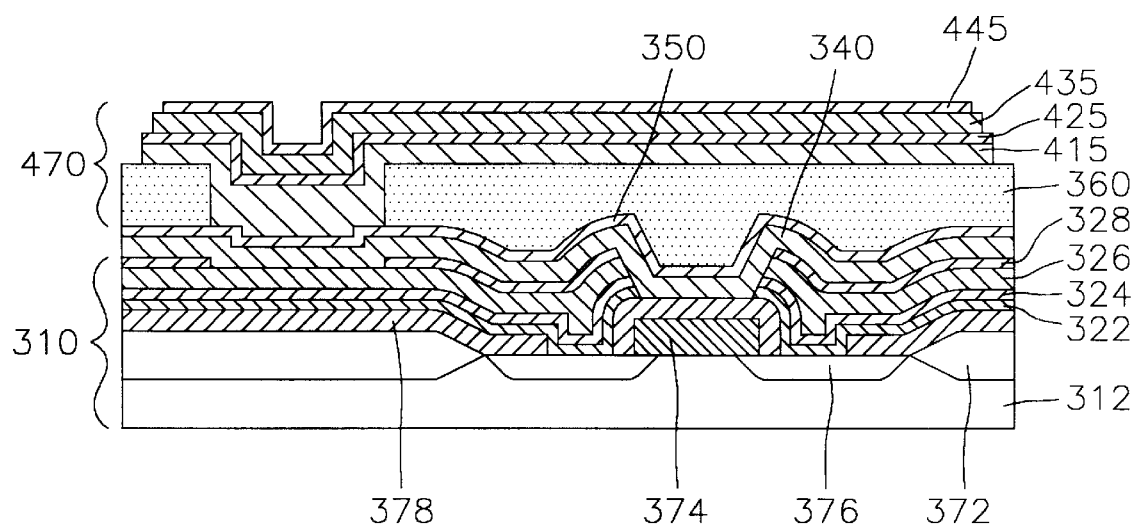

In an ensuing step, as shown in FIG. 3I, the multiple layered structure 460 is patterned into an array of M×N semifinished actuating structures 470 by using a photolithography or a laser trimming method, until the thin film sacrificial layer 360 is exposed, wherein each of the semifinished actuating structures 470 includes a first thin film electrode 445, a thin film electrodisplacive member 435, a second thin film electrode 425 and an elastic member 415.

Figure 3J:
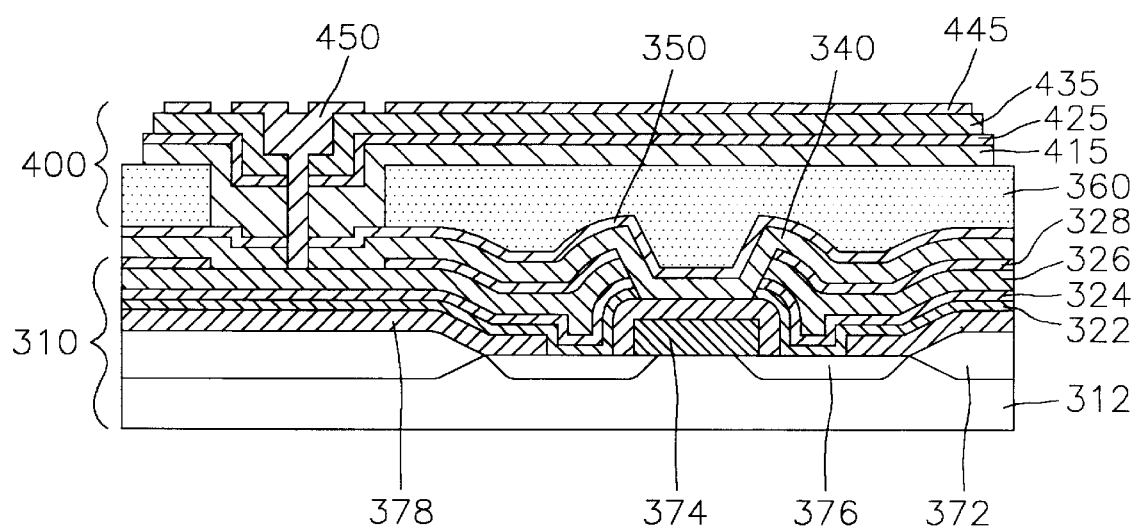

In a subsequent step, an array of M×N conduit 450 is created in the semifinished actuating structures 470, wherein each of the conduit 450 extends from top of the thin film electrodisplacive member 435 to top of a corresponding connecting terminal 326 and is electrically disconnected to the first thin film electrode 445, to thereby form an array of M×N actuating structures 400, as shown in FIG. 3J.

Figure 3K:
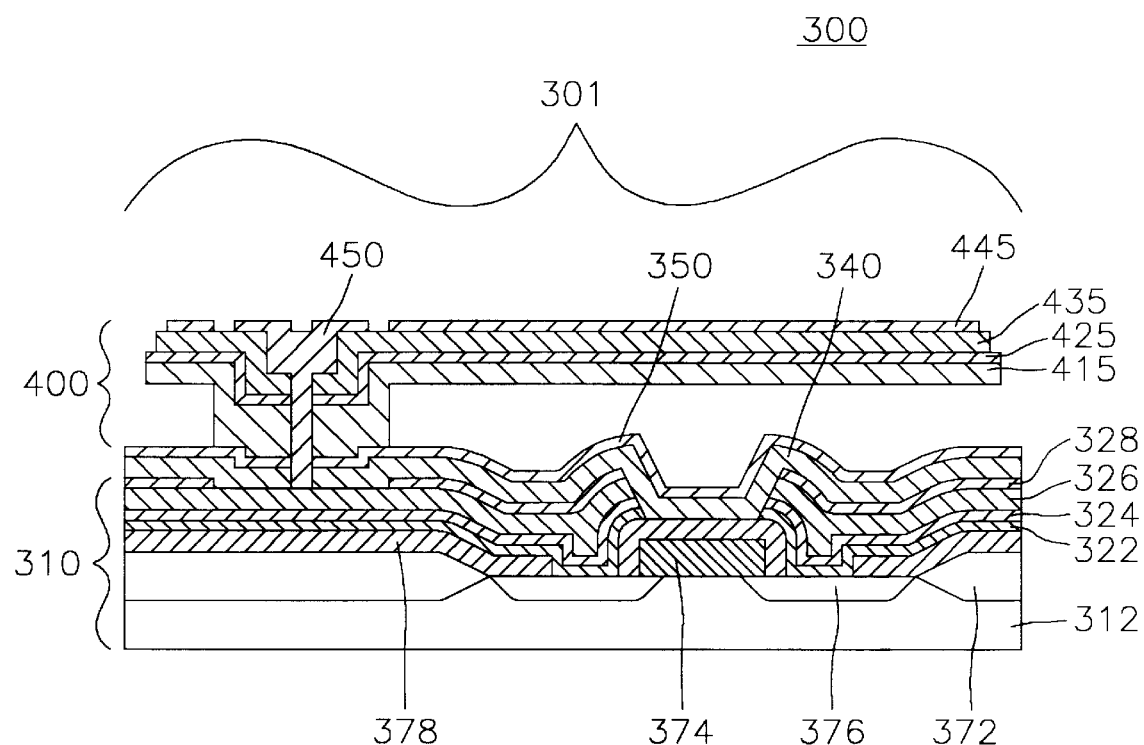

The thin film sacrificial layer 360 is then removed by using an wet etching method using an etchant or a chemical, e.g., hydrogen fluoride (HF) vapor to thereby form the array 300 of M×N thin film actuated mirrors 301, as shown in FIG. 3K.

In FIGS. 4A to 4K, there are provided with schematic cross sectional views illustrating a method for manufacturing an array 300 of M×N thin film actuated mirrors 301 in accordance with another embodiment of the present invention shown in FIG. 2B.

Figure 4A:
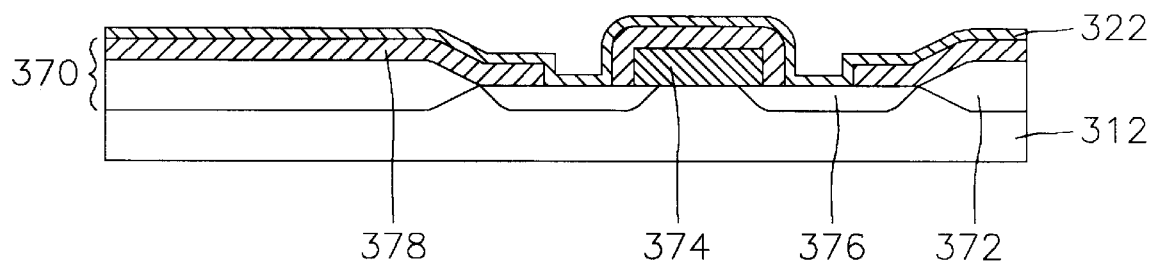
FIGS. 4A to 4K are schematic cross sectional views illustrating a method for manufacturing the array of M×N thin film actuated mirrors shown in FIG. 2B.

First, an adhesion layer 322, made of, e.g., titanium (Ti) or titanium rich titanium nitride (Ti rich TiN), and having a thickness of 100–500 Å, is deposited on top of a substrate 312 by using a sputtering or CVD method, as shown in FIG. 4A.

Figure 4B:
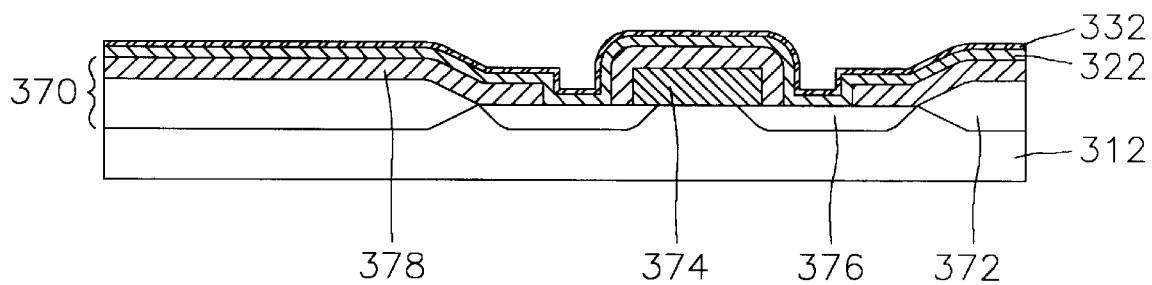

Subsequently, a lower diffusion barrier layer 332, made of, e.g., TiN, and having a thickness of 500–700 Å, is deposited on top of the adhesion layer 322 by using a sputtering method, TiN grains in the lower diffusion barrier layer 332 having a specific grain size of, e.g., 150–200 Å, the grain size of the lower diffusion barrier layer 332 being controlled by heat treatment, deposition pressure and substrate temperature ($T_1$) during the deposition thereof, as shown in FIG. 4B.

Figure 4C:
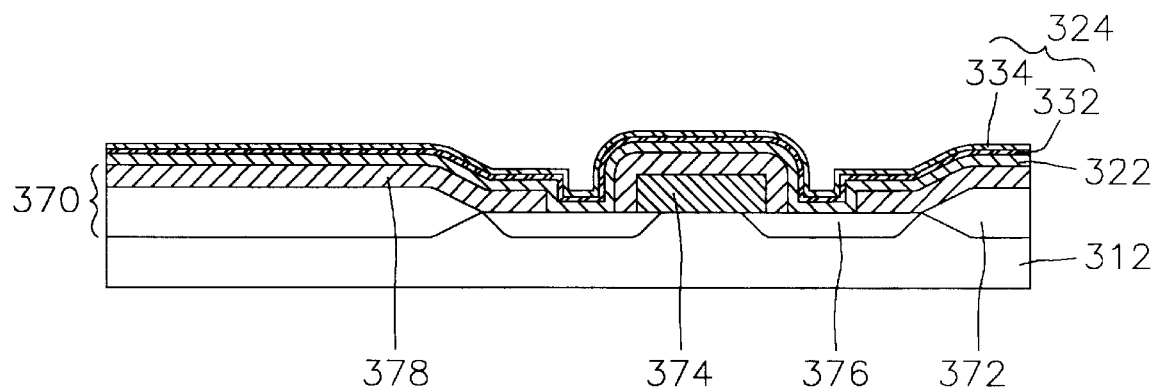
Figure 4D:
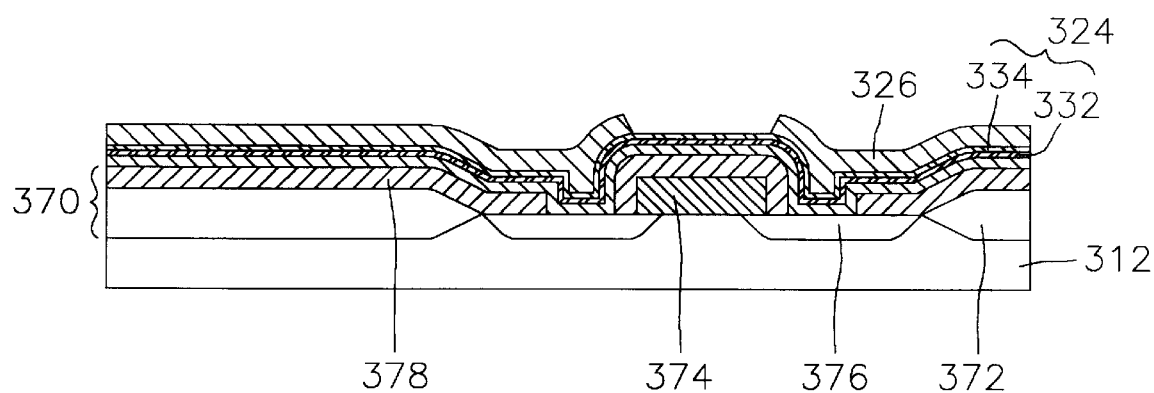
Figure 4E:
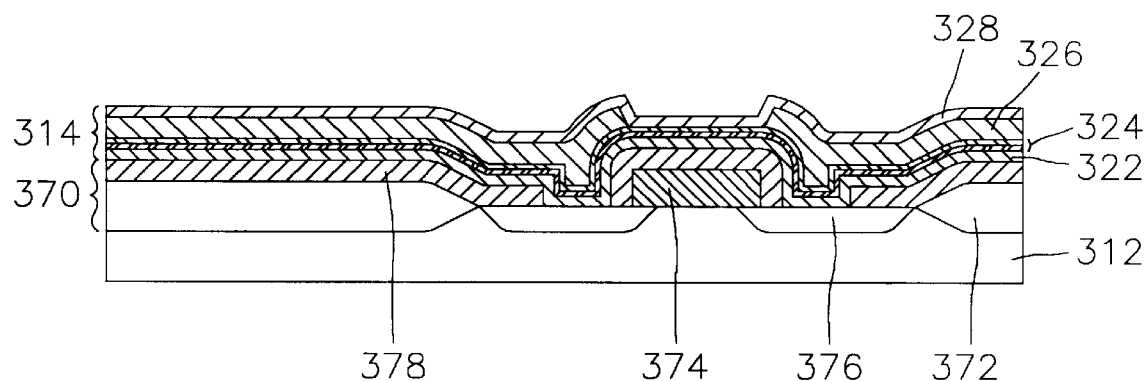
Figure 4F:
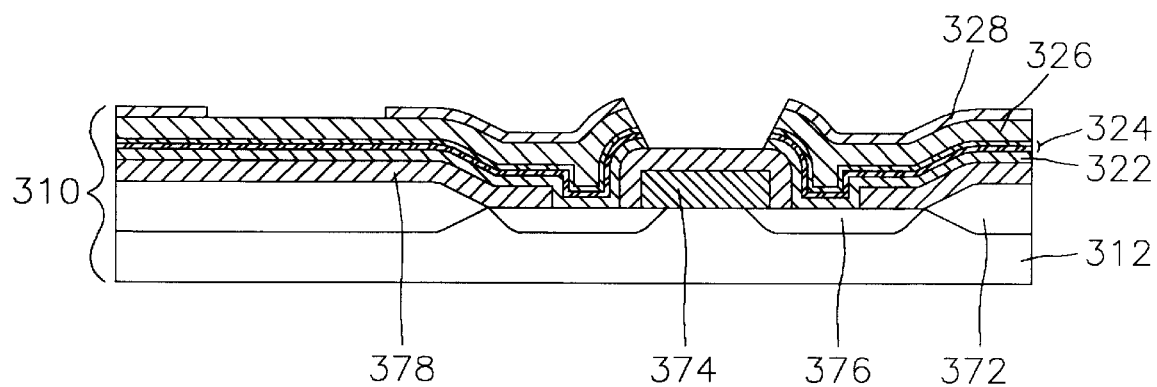
Figure 4G:
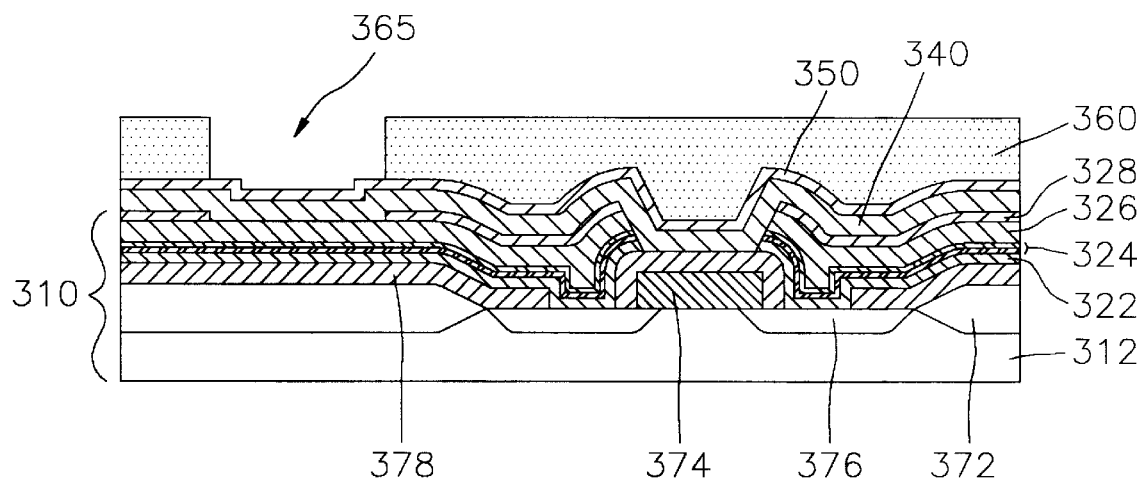
Figure 4H:
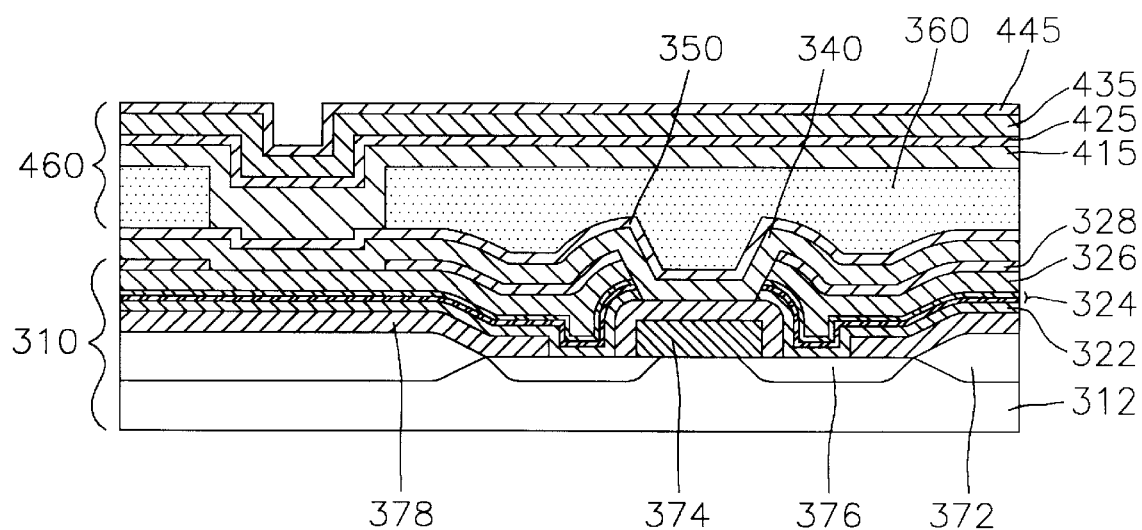
Figure 4I:
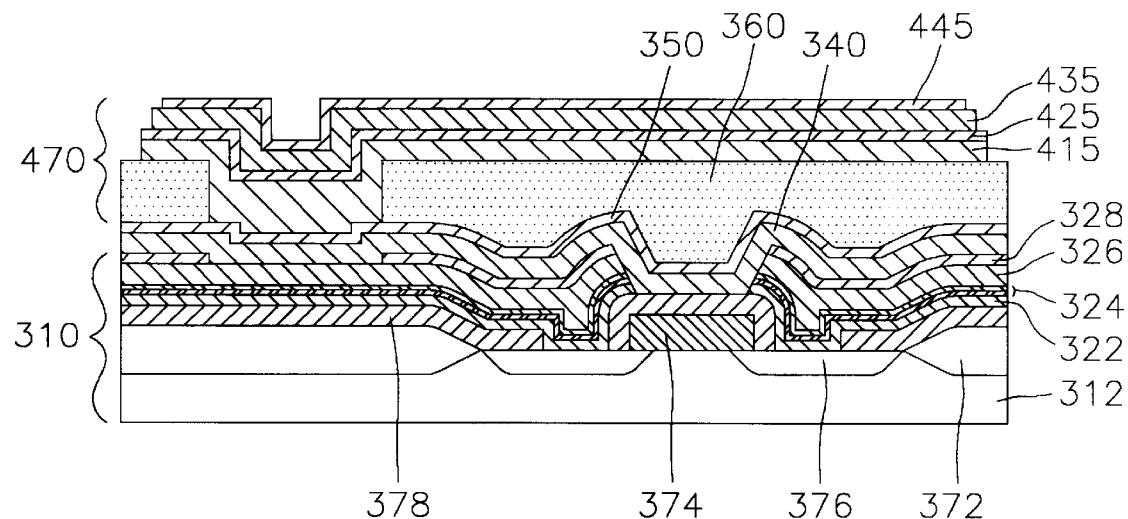
Figure 4J:
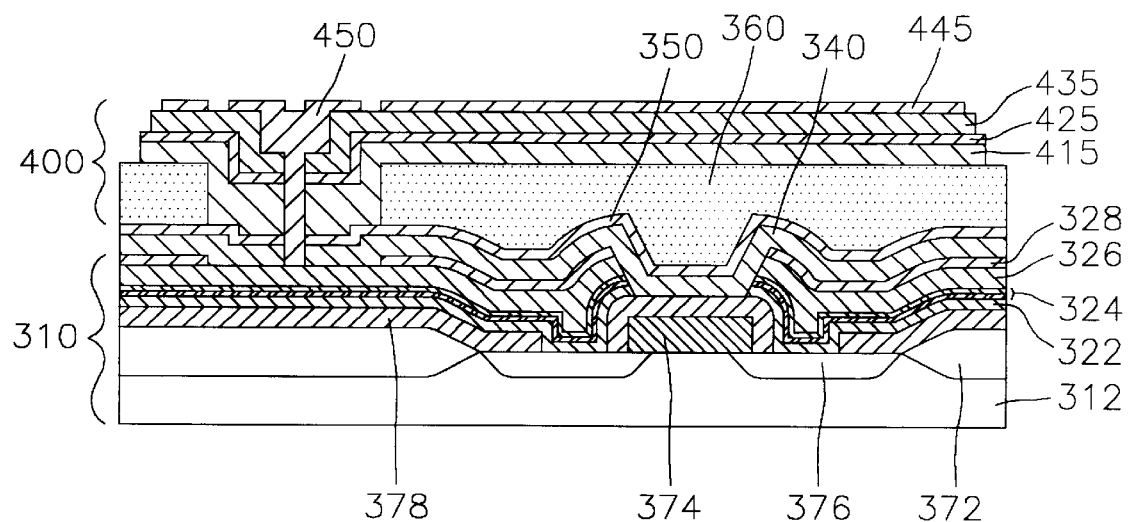
Figure 4K:
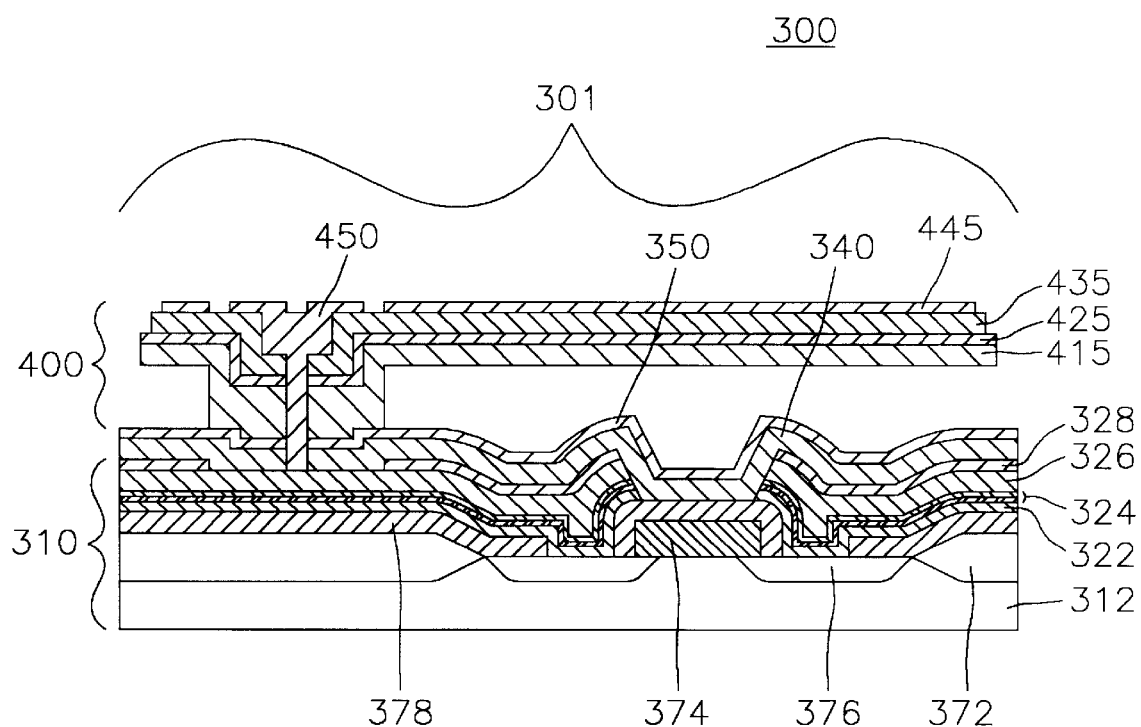

Thereafter, an upper diffusion barrier layer 334, made of, e.g., TiN, and having a thickness of 300–700 Å, is deposited on top of the lower diffusion barrier layer 332 by using a sputtering method, TiN grains in the upper diffusion barrier layer 334 having a specific grain size of, e.g., 80–100 Å, the grain size of the upper diffusion barrier layer 334 being controlled by heat treatment, deposition pressure and substrate temperature ($T_2$) during the deposition thereof, thereby forming a diffusion barrier layer 324 including the lower and upper diffusion barrier layer 332, 334, as shown in FIG. 4C.

The further method shown in FIGS. 4D to 4K is same as in the above embodiment shown in FIGS. 3D to 3K, and the same reference numerals indicate same or similar elements, and therefore a further description thereof is omitted herein.

In the inventive array 300 of M×N thin film actuated mirrors 301 and method for the manufacture thereof, in order to prevent the formation of tungsten silicide in the connecting terminal 326, the diffusion barrier layer 324 is formed between the substrate 312 and the connecting terminal 326, wherein the diffusion barrier layer 324 is crystallized to a cubic structure, the close packing plane of the cubic structure being parallel to the horizontal direction of the substrate 312, or the diffusion barrier layer 324 is formed into the lower and upper diffusion barrier layer 332, 334, the grain size of TiN grains in the lower diffusion barrier layer 332 being larger than that of the upper diffusion barrier layer 334.

While the present invention has been described with respect to certain preferred embodiments only, other modifications and variations may be made without departing from the scope of the present invention as set forth in the following claims.

What is claimed is:

1. An array of thin film actuated mirrors comprising:
    an active matrix including a substrate, an array of transistors, an adhesion layer, a diffusion barrier layer, an array of connecting terminals and a stress balancing layer, in a successive order; and
    an array of actuating structures, each of the actuating structures including a first thin film electrode, a thin film electrodisplacive member, a second thin film electrode, an elastic member and a conduit, wherein the thin film electrodisplacive member is positioned between the thin film electrodes and the conduit electrically connects one of the thin film electrodes to a corresponding connecting terminal.

2. The array of claim 1, wherein the adhesion layer is selected from a group consisting of titanium (Ti) or titanium-rich titanium nitride.

3. The array of claim 1, wherein the diffusion barrier layer is made of titanium nitride (TiN) crystallized to a cubic structure.

4. The array of claim 3, wherein a close-packing plane of the cubic structure is parallel to a horizontal direction of the substrate.

5. The array of claim 1, wherein the diffusion barrier layer is divided into a lower and an upper diffusion barrier layers.

6. The array of claim 5, wherein a grain size of TiN grains in the lower diffusion barrier layer is larger than that of the upper diffusion barrier layer.

7. The array of claim 1, wherein the stress balancing layer is made of cubic-titanium nitride (C—TiN).

8. The array of claim 1, wherein each of the connecting terminals is made of a tungsten (W).

9. The array of claim 1 further includes a passivation layer and an etchant stopping layer formed on top of the active matrix, successively.

10. The array of claim 1, wherein one of the thin film electrodes as a top layer in each of the actuating structures functions as a mirror.

11. A method for manufacturing an array of thin film actuated mirrors comprising the steps of:
    preparing a substrate including an array of transistors formed thereon;
    forming an adhesion layer;
    forming a diffusion barrier layer on the adhesion layer;
    forming an array of connecting terminals;
    forming a stress balancing layer to form an active matrix;
    forming a thin film sacrificial layer including an array of pairs of empty cavities;
    forming an array of actuating structures on the thin film sacrificial layer, wherein each of the actuating structures includes a first thin film electrode, a thin film electrodisplacive member, a second thin film electrode, an elastic member and a conduit; and
    removing the thin film sacrificial layer to form an array of thin film actuated mirrors.

12. The method of claim 11, wherein the step of forming the diffusion barrier layer includes a deposition using a PVD method and a heat treatment for releasing the stress, densifying and allowing a phase transition to take place.

13. The method of claim 11, wherein the diffusion barrier layer is formed by:
    depositing a lower diffusion barrier layer by using a sputtering method at a first deposition temperature ($T_1$); and
    depositing an upper diffusion barrier layer by using a sputtering method at a second deposition temperature ($T_2$).

14. The method of claim 13, wherein the first deposition temperature ($T_1$) is higher than the second deposition temperature ($T_2$).

15. The method of claim 11 further comprising a step of forming a passivation layer and an etchant stopping layer, successively, on top of the stress balancing layer.

16. A method for manufacturing an array of thin film actuated mirrors comprising the steps of:
    preparing a substrate including an array of transistors formed thereon;
    depositing an adhesion layer;
    forming at least a diffusion barrier layer on the adhesion layer;
    forming an array of connecting terminals;
    depositing a stress balancing layer to form a multi-purpose layer;

removing the multi-purpose layer, selectively, to form an active matrix;

depositing a passivation layer and an etchant stopping layer on the active matrix;

forming a thin film sacrificial layer including an array of pairs of empty cavities;

depositing an elastic layer, a second thin film layer, a thin film electrodisplacive layer and a first thin film layer on the thin film sacrificial layer to form a multiple layered structure;

patterning the multiple layered structure into an array of semifinished actuating structures until the thin film sacrificial layer is exposed;

forming an array of conduits to form an array of actuating structures; and removing the thin film sacrificial layer to form an array of thin film actuated mirrors.

17. A thin film actuated mirror comprising:

an active matrix including a substrate, a transistor, a multi-purpose layer including a lower diffusion barrier layer, an upper diffusion barrier layer, a connecting terminal and a stress balancing layer, in a successive order, a passivation layer and an etchant stopping layer, in a successive order; and an actuating structure including a first thin film electrode, a thin film electrodisplacive member, a second thin film electrode, an elastic member and a conduit, wherein the thin film electrodisplacive member is positioned between the first and the second thin film electrodes and the conduit applies an electrical signal to one of the thin film electrodes.

18. The actuated mirror of claim 17, wherein the lower and the upper diffusion barrier layers are made of titanium nitride (TiN).

19. The actuated mirror of claim 18, wherein the grain size of TiN grains in the lower diffusion barrier layer is larger than that of the upper diffusion barrier layer.

20. The actuated mirror of claim 17, wherein the multi-purposed layer includes an adhesion layer, a diffusion barrier layer, a connecting terminal and a stress balancing layer, in a successive order.

21. The actuated mirror of claim 20, wherein the adhesion layer is selected from a group consisting of titanium (Ti) or titanium-rich titanium nitride (Ti-rich TiN).

22. The actuated mirror of claim 21, wherein the diffusion barrier layer is made of titanium nitride (TIN) crystallized to a cubic structure and a close-packing plane thereof is parallel to a horizontal direction of the substrate.

23. A method for manufacturing a thin film actuated mirror comprising the steps of:

preparing a substrate including a transistor formed thereon;

forming a multi-purpose layer on the substrate, the step of forming the multi-purpose layer including steps of forming an adhesion layer; forming a diffusion barrier layer; forming a connecting terminal; and forming a stress balancing layer, successively;

forming a thin film sacrificial layer including a pair of empty cavities;

forming an actuating structure on the thin film sacrificial layer, wherein the actuating structure includes a first thin film electrode, a thin film electrodisplacive member, a second thin film electrode, an elastic member and a conduit; and removing the thin film sacrificial layer to form the thin film actuated mirror.

24. The method of claim 23, wherein the step of forming the diffusion barrier layer includes a deposition using a PVD method and a heat treatment for releasing the stress, densifying and allowing a phase transition to take place.

25. The method of claim 23, wherein the step of forming the multi-purposed layer comprises of: forming a lower diffusion barrier layer at a first deposition-temperature ($T_1$); forming an upper diffusion barrier layer at a second deposition-temperature ($T_2$); forming a connecting terminal; and forming a stress balancing layer, successively.

26. The method of claim 25, wherein the first deposition-temperature ($T_1$) is higher than the second deposition-temperature ($T_2$).

* * * * *